United States Patent [19]
Beerbaum

[11] 3,912,882
[45] Oct. 14, 1975

[54] REMOTE LOOP-BACK TERMINATING UNIT FOR TESTING TELEPHONE

[75] Inventor: Ronald Helmut Beerbaum, Southbury, Conn.

[73] Assignee: TM Systems,, Bridgeport, Conn.

[22] Filed: Dec. 7, 1973

[21] Appl. No.: 422,898

[52] U.S. Cl. .......................... 179/175.3 R; 179/2 A
[51] Int. Cl.$^2$ .......................... H04B 3/46
[58] Field of Search .................... 179/175.3 R, 2 A; 340/147 F, 171 R

[56] References Cited

UNITED STATES PATENTS

| | | | |
|---|---|---|---|
| 2,214,130 | 9/1940 | Green et al. | 179/175.3 R |
| 3,371,165 | 2/1968 | Earle et al. | 179/175.3 R |
| 3,636,280 | 1/1972 | Wetzel | 179/175.3 R |
| 3,663,769 | 5/1972 | Boatwright et al. | 179/175.3 R |
| 3,739,107 | 6/1973 | Spencer | 179/175.3 R |
| 3,773,986 | 11/1973 | Tremblay | 179/175.3 R |
| 3,790,723 | 2/1974 | Stewart | 179/175.3 R |
| 3,843,848 | 10/1974 | Cox | 179/175.3 R |

*Primary Examiner*—Kathleen H. Claffy
*Assistant Examiner*—Douglas W. Olms

[57] ABSTRACT

A remote loop-back terminating unit adapted to test a telephone line extending between a central station and a customer's terminal equipment located at a remote point. The unit is interposed between the remote end of the line and the customer's equipment and is normally transparent to intelligence signals carried on the line. To test the condition of the line, a check tone burst is applied to the line at the central station, the burst having a predetermined frequency and duration. The unit includes a detector coupled to the line and responsive to the check tone irrespective of whether the terminal equipment is shorted, open or grounded, the detector being insensitive to all other signals. When a check tone is sensed at the unit, a switch is activated which disconnects the terminal equipment from the remote end of the line and in lieu thereof connects a test termination thereto. A test tone having a predetermined frequency and duration is then applied by the unit to the line, making it possible at the central station to determine the operating characteristics and continuity of the line.

10 Claims, 3 Drawing Figures

REMOTE LOOP-BACK TERMINATING UNIT FOR TESTING TELEPHONE

BACKGROUND OF THE INVENTION

This invention relates generally to the testing of telephone loops, and more particularly to a remote loop-back test system adapted to identify and isolate a system fault by conducting a test of the suspected telephone line from the central office without involving the customer's terminal equipment.

Telephone loops are lines or cable pairs that provide transmission paths between terminal equipment at various remote customer locations and the local switching office that serves these customers. Telephone loops not only function to convey voice signals but are now widely used for data transmission in conjunction with teleprinters, facsimile devices, computers and other data processing or terminal equipment operated by direct-current, binary, ternary and other forms of digital and analog intelligence signals.

Telephone lines designed for voice communication have an effective bandwidth of about 300 Hz to 3000 Hz. Direct-current signals and signals having a frequency below 300 Hz or above 3,000 Hz normally cannot be conveyed through ordinary communication circuits. The rapid signal transitions encountered in binary or other digital signals couple into adjacent circuits and cause interference, such as cross talk and noise.

For these reasons it is the practice to feed data signals through data sets (Modems) wherein the data signals modulate a carrier that is transmitted over the telephone line and then demodulated to recover the original data. The frequency and amplitude of the carrier, the type of modulation used and the requisite equalization must be carefully chosen to afford accurate data transmission which does not interfere with adjacent circuits, pilot and signal tones etc. which are also a part of the transmission medium.

Various data sets are currently available from United States telephone companies for data transmission over the public telephone network, the choice of data set depending on the nature of the terminal equipment. Thus data set No. 602 is designed for 0 to 7V dc to 900 Hz facsimile transmission, whereas data set No. 201A is intended for tape and computer operation in which the maximum bit rate is 2000.

In the typical installation, the terminal equipment which may, for example, be a computer, is leased or purchased from a computer manufacturer, whereas the Modem telephone line supplying data to the computer is leased to the customer by the telephone company. On occasion, a customer will notify the telephone company that his terminal equipment is inoperative or functioning poorly. This may be because of a fault in the telephone line linking the equipment to the central office or by reason of a defect in the equipment itself. But the calling customer hass no knowledge of where the fault lies and is assuming that it is the line which is defective.

The telephone company's responsibility is limited to the telephone line feeding the customer and if the failure of the terminal equipment to operate properly is due to a defective line, then the customer is entitled to a rebate in his leasing fees to cover the interruption in service. However, if the line is in good working order and the fault resides in the terminal equipment, then the telephone company bears no responsibility for this defect and is entitled to its full leasing fee despite the fact that the equipment is unable to function.

An equipment fault may impose a short across the remote end of the telephone line, or an open or grounded circuit. Hence to test the line it is necessary, at the outset, to disconnect the terminal equipment therefrom. With test procedures heretofore used, the telephone company has no means for determining whether a line is defective or in good condition without involving the customer's terminal equipment.

When notified by the customer that his terminal equipment is not working, the telephone company must assign service personnel to disconnect the customer's terminal equipment from the line so that line tests can be carried out independently of the equipment. It therefore becomes necessary for service personnel to travel to the customer's installation and there (a) disconnect the remote end of the line from the equipment, (b) connect a termination resistor across the line, and (c) apply a test zone to the line so that continuity and other tests can be conducted at the input end of the line at the central station.

And even if the terminal equipment is provided with mechanically-operated switches and line test circuits, as is sometimes the case, then the customer, rather than service personnel, under the direction of the telephone company, must operate line test devices. The difficulty with this alternative procedure is that the telephone company must rely on the ability of the customer to assist in conducting the line test, and this ability is sometimes deficient.

Existing line testing procedures are costly and time consuming and may unduly delay the resumption of service. Even if the fault is found to lie in the terminal equipment and not in the telephone line, the customer is usually not made aware of this fact until service personnel have arrived at his installation and conducted the necessary line tests. This may take several hours or even days and often results in substantial losses both to the telephone company and to the customer.

SUMMARY OF THE INVENTION

In view of the foregoing it is the main object of this invention to provide a remote loop-back terminating unit adapted to test a telephone line extending between a central station and terminal equipment located at a remote point without involving the customer's equipment.

More specifically, it is an object of this invention to provide a unit of the above-noted type which is interposed at the customer's location between the remote end of the telephone line and the terminal equipment and is normally transparent to intelligence signals conveyed by the line, whereby the unit in no way interferes with the normal operation of the terminal equipment.

A significant advantage of the invention is that the terminating unit is activated by a check tone applied to the telephone line at the central station, which check tone, when detected by the unit, automatically disconnects the terminal equipment from the remote end of the line and shunts a termination resistor thereacross, a test tone being then applied to the line which makes it possible to test the line at the central station without the need for service personnel at the customer's site.

Also an object of the invention is to provide a terminating unit which is applicable to a two wire or a four wire telephone system, and which in the four wire mode may be used as a full loop-back device with or without a test tone return.

Yet another object of the invention is to provide a low-cost loop-back terminating unit of simple design which operates efficiently and reliably without the need for adjustment or maintenance.

Briefly stated, these objects are attained in a remote loop-back terminating unit which is installed at a customer's location and is interposed between the remote end of a telephone line and the terminal equipment connected thereto, the unit being normally transparent to intelligence signals transmitted by a central station to the terminal equipment.

To test the condition of the line, a check tone burst is applied to the line at the central station, the burst having a predetermined frequency and duration. Included in the unit is a detection circuit coupled to the line and responsive to the check tone without regard to whether the terminal equipment is shorted, grounded or open circuited, the detection circuit being insensitive to all other signals borne by the line.

When a check tone is detected, a switch is activated that acts to disconnect the terminal equipment from the remote end of the line and, in lieu thereof, to connect a dummy load or test termination thereacross, the switch acting also to apply a distinctive test tone generated by the unit to the line, making it possible at the central station to test the continuity and the characteristics of the line.

OUTLINE OF THE DRAWINGS

For a better understanding of the invention as well as other objects and further features thereof, reference is made to the following detailed description to be read in conjunction with the accompanying drawings, wherein.

DESCRIPTION OF THE INVENTION

First Embodiment

Figure 1:
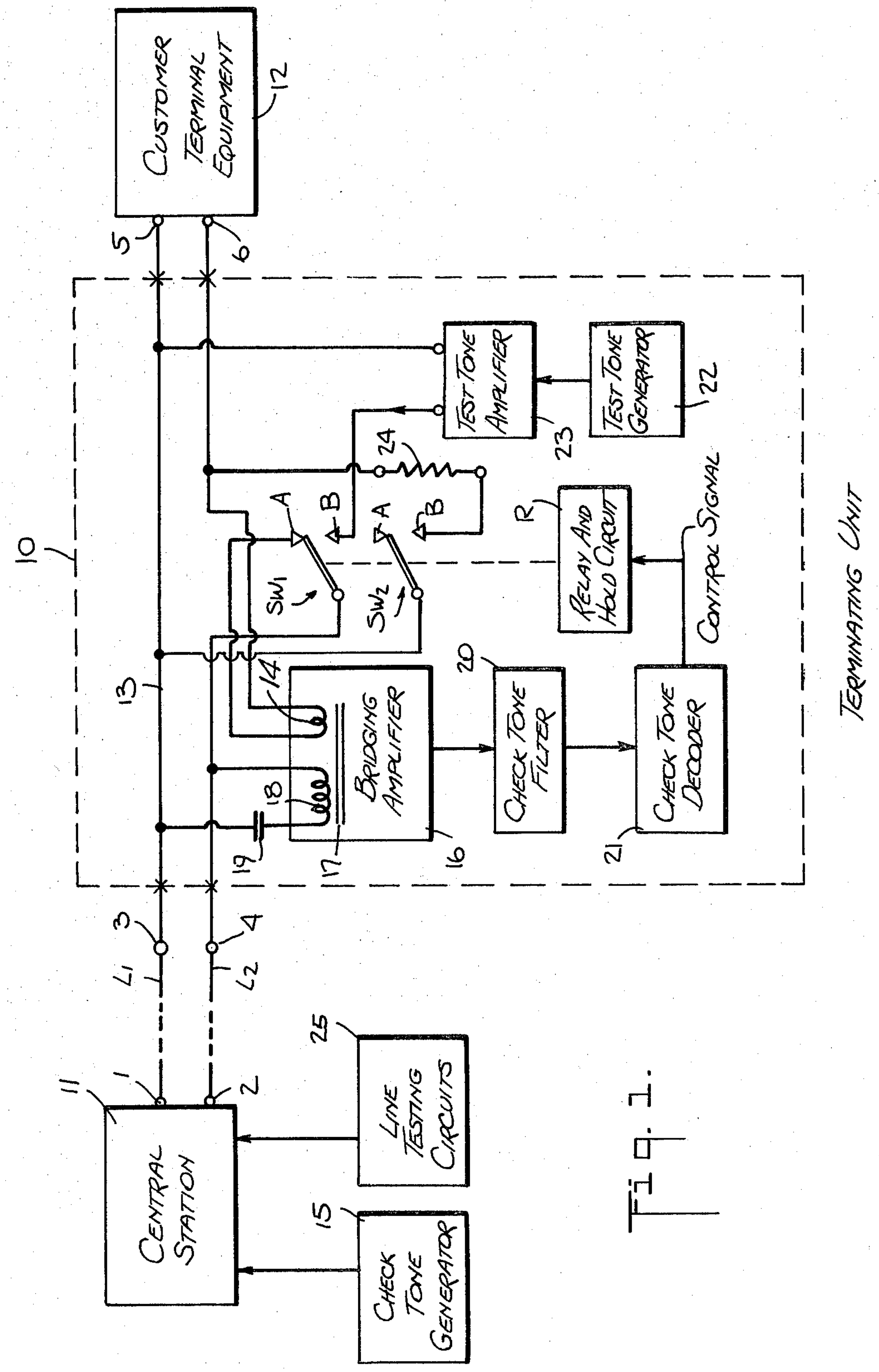
FIG. 1 is a block diagram of one preferred embodiment in accordance with the invention of a remote loop-back terminating unit adapted to test a telephone line.

Referring now to FIG. 1, there is shown one preferred embodiment of a remote loop-back terminating unit, generally designated by numeral 10, for testing a telephone loop $L_1$, $L_2$ extending between a central station 11 and terminal equipment 12 installed at the customer's location. The nature of the terminal equipment forms no part of the present invention, for the terminating unit is usable with any existing type of equipment which can be supplied with data signals conveyed over the telephone or modern loop. And while the invention, for reasons of simplicity, is illustrated in conjunction with a two-wire telephone loop, it will be appreciated that it is equally applicable to a four-wire line.

Terminals 1 and 2 at central station 11 represent the input end of loop $L_1$, $L_2$ and terminals 3 and 4 represent the remote end of the loop. Terminals 5 and 6 on the terminal equipment are normally connected directly to end terminals 3 and 4 but in the present invention, terminating unit 10 is interposed therebetween.

In test unit 10, lead 13 connects the remote end terminal 3 directly to input terminal 5 of the terminal equipment, whereas remote end terminal 4 is connected to input terminal 6 of the terminal equipment through the normally-closed contact A of a switch section $SW_1$ in series with a low-impedance primary coil 14. Relay R which drives switch section $SW_1$ is also provided with a second switch section $SW_2$, both sections $SW_1$ and $SW_2$ having a normally-closed contact A and a normally-open contact B. When relay R is energized, the armatures of switches $SW_1$ and $SW_2$ transfer from contacts A to contacts B.

Thus in the normal state, line $L_1$ is directly connected to terminal 5 of terminal equipment 12 whereas line $L_2$ is connected to input terminal 6 through closed contact A of switch $SW_1$ in series with low-impedance coil 14, whereby data signals carried by the telephone loop are supplied to the terminal equipment. The low-impedance coil 14 introduces no significant attenuation in the telephone line, so that unit 10 in the normal state is effectively transparent to the data signals.

When it is necessary to check the condition of telephone loop $L_1$, $L_2$ because of a customer complaint or for any other reason, à check tone burst, produced by a check tone generator 15 at the central station, is applied to the loop.

This check tone burst has a predetermined frequency and duration. In practice, a suitable frequency for the check tone is 2,713 Hz which is well within the 300 to 3000 Hz bandpass of the telephone line, and the duration of the tone is 10 seconds. It will be appreciated that other check tone frequencies and durations may be used, such as a 2,500 Hz tone having a 5 second duration. The reason why the duration of the check tone must be in excess of about 4 seconds is that, inevitably, signal or voice frequencies will be transmitted on the telephone line that include the test tone frequency, but these frequencies will have a transitory duration. The relatively prolonged duration of the check tone makes it possible to discriminate between the check tone and signal transients having the same frequency or a frequency proximate thereto.

The arrangement is such that the terminating unit 10 is activated only when the proper check tone is transmitted from the central station. This is accomplished by a detection circuit which includes a bridging amplifier 16 coupled to the line through a transformer 17 having a high-impedance primary winding 18 connected across the telephone loop $L_1$, $L_2$ through a coupling capacitor 19 which provides D-C isolation.

The low impedance coil 14 is included as an auxiliary primary winding of transformer 17 but this coil is not connected in parallel relation to loop $L_1$, $L_2$ but in series therewith. The reason for both a parallel and series coupling to the telephone loop will now be explained.

In the condition where terminal equipment 12 is operating properly, then its input impedance is properly matched to the loop impedance, and when a check tone is transmitted, this tone will readily be intercepted by the high-impedance input primary 18 to induce a voltage in the secondary of the transformer which is applied to bridging amplifier 16. In the condition where the terminal equipment is defective and presents an open circuit with respect to loop $L_1$,$L_2$, here again the check tone will be intercepted by the high-impedance input primary 18.

But should the defect in the terminal equipment result in a grounding or short circuiting of loop $L_1$,$L_2$, the short circuit is then effectively imposed across high-impedance primary 18 and a check tone will not be applied to bridging amplifier 18 through this primary. However with the short circuit, the current flow through low-impedance primary coil 14 will be high, hence the check tone will be transferred by coil 14 to bridging amplifier 16. Thus regardless of the condition of the customer's equipment, when a check tone is transmitted, it will be intercepted by bridging amplifier 16 either by way of primary 18 or primary 14.

The amplified check tone output of amplifier 16 is applied to a highly selective check tone filter 20 markedly attenuates all frequencies other than the check tone frequency and feeds the selected check tone to a check tone decoder 21. The decoder may be in the form of a frequency-discriminator or phase-lock detector to convert the check tone into a corresponding analog voltage. This voltage is integrated to produce a control signal only when the check tone is of proper duration. If therefore a signal whose frequency corresponds to the check tone is intercepted and lasts for say three seconds, no control signal will be produced, but if the check tone lasts for the predetermined period of 10 seconds or more, then a control signal will be developed.

The control signal yielded by decoder 21 acts to actuate relay R, causing switches $SW_1$ and $SW_2$ to transfer from contact A to B. Relay R operates in conjunction with a suitable hold circuit, so that it remains actuated for a predetermined period of say 30 seconds.

Test-tone generator 22 produces a test tone whose frequency is suitable for test purposes, such as 900 Hz. This test tone is amplified by test-tone amplifier 23 and is applied through contact B of switch $SW_1$ to the telephone $L_1$,$L_2$ only when relay R is actuated. Hence the test tone is applied to the telephone line for 30 seconds. At the same time a terminating resistor 24 whose AC value is preferably 900 ohms and whose D-C value is preferably 33 K ohms, is connected across the line through contact B of switch $SW_2$ for the same 30 second period. Contact A of switch $SW_2$ is unused.

Thus in reply to the check tone, the unit sends a test tone to the central station during the 30 second reply period. The amplitude and waveform of the 900 Hz test tone can be tested by suitable test circuits 25 located at the central station 11 to determine the operating characteristics of the line. The continuity of the line can also be checked.

To summarize the operation of the test unit, when one wishes to check the condition of a suspected telephone loop leading to a particular customer, a check tone is applied to the line at the central station. The unit is installed at the customer's terminal equipment acts to detect the check tone and if the check tone has the proper frequency and duration, a control signal is produced which activates a switching network to disconnect the termial equipment from the line and to connect in lieu thereof a termination or dummy load. The unit also applies to a test tone to the line for a predetermined period to permit testing at the central station end.

While in the embodiment shown, the activation of the test unit applies a termination resistor and a test tone to the line, the activated switching network may be designed to apply other forms of testing signals or circuits to the line to facilitate test procedures at the central station.

Second Embodiment

Figure 2:
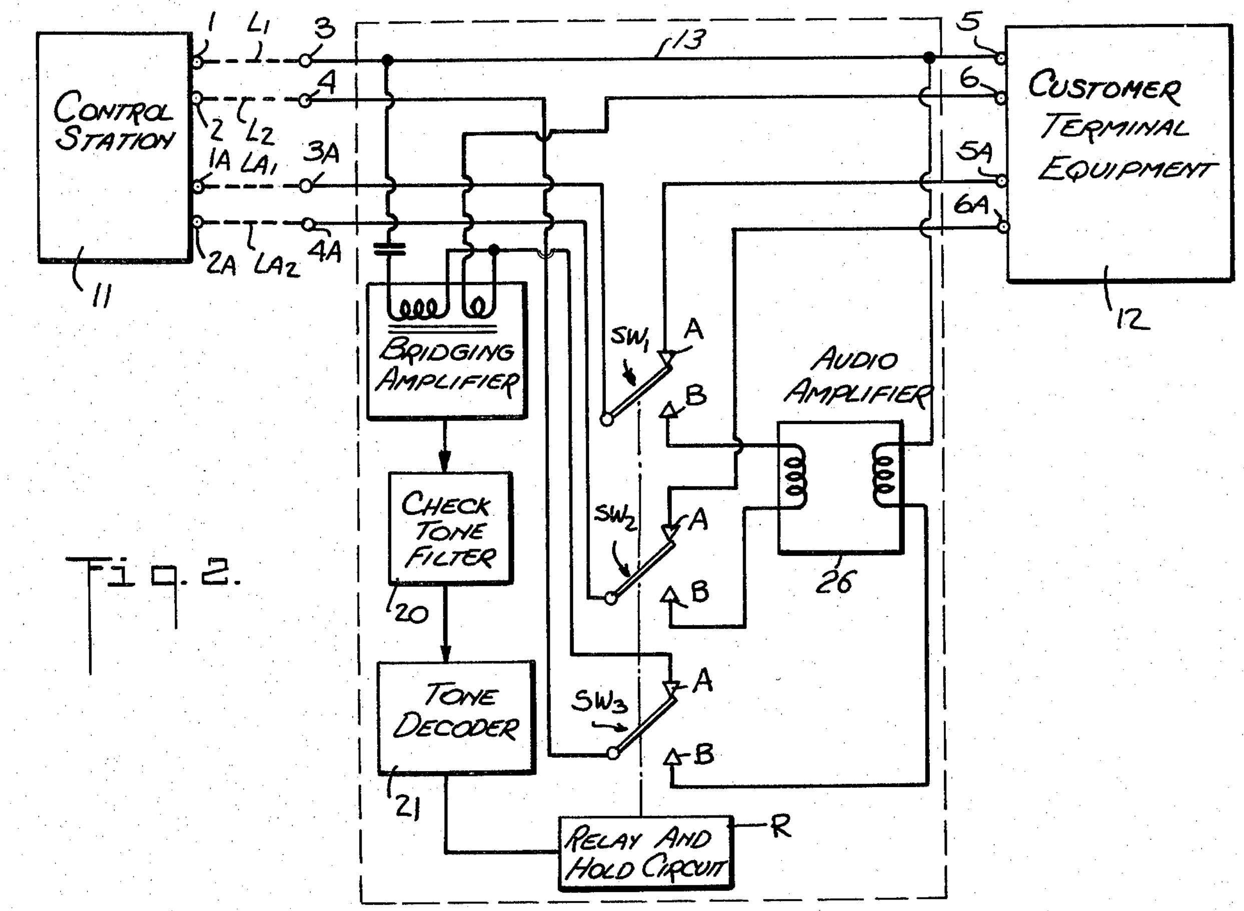
FIG. 2 is a block diagram of another preferred embodiment of the unit.

In the four-wire arrangement shown in FIG. 2, the normal connection between central station 11 and terminal equipment 12 is by way of a "receive" loop $L_1$,$L_2$ and a "transmit" loop $LA_1$,$LA_2$, the first loop normally extending between station terminals 1 and 2 and equipment terminals 5 and 6, and the second loop between station terminals 1A and 2A and equipment terminals 5A and 6A.

In the arrangement shown in FIG. 2, the terminating unit which is interposed between the lines and the terminal equipment is arranged to effect a full loop-back connection plus audio gain to provide zero loss. To this end, relay R has three switching sections $SW_1$,$SW_2$ and $SW_3$.

One end of high-impedance primary 18 of the bridging amplifier input transformer 17 is connected through capacitor 19 to line $L_1$ and the other end of primary 18 is connected in series with low-impedance coil 14 to equipment terminal 6. Station terminal 1A is connected through line $LA_1$ to equipment terminal 5A only when switch $SW_1$ engages contact A. The input of an audio amplifier 26 is connected between the B contact of switch $SW_1$ and the B contact of switch $SW_2$, while the output of this amplifier is connected between the B contact of switch $SW_3$ and equipment terminal 5, this terminal being connected through lead 13 and line $L_1$ to station terminal 1.

Line $L_2$ is connected through the A contact of switch $SW_3$ and through low-impedance coil 14 to station terminal 6 and line $LA_2$ is connected through the A contact of switch $SW_2$ to equipment terminal 6A.

When in the normal state, no check tone is transmitted and switches $SW_1$, $SW_2$ and $SW_3$ all dwell on their A contacts, loop $L_1$,$L_2$ extending from station terminals 1 and 2 to end terminals 3 and 4 is connected to equipment terminals 5 and 6, and series-connected primary coils 14 and 18 are connected across terminals 3 and 4. In this same state, loop $LA_1$ and $LA_2$ extending from station terminals 1A and 1B to end terminals 3A and 3B are connected to equipment terminals 5A and 6A.

But when a check tone of the proper frequency and duration is detected by bridging amplifier 16, check tone filter 20 and check tone decoder 21 to yield a control signal. This control signal actuates relay R, causing switches $SW_1$, $SW_2$ and $SW_3$ to transfer to their B contacts for a predetermined hold period, which in practice may be two minutes rather than 30 seconds as in the first embodiment.

When the switches occupy their B contacts, the station terminals 1A and 1B are connected through lines $LA_1$ and $LA_2$ to the input of audio amplifier 26 whose output is connected to lines $L_1$ and $L_2$ to provide full loop back. The amplifier which in practice may have a 16 db maximum gain, is adjustable so that the gain may be set to compensate for line losses and thereby produce a zero loss.

With this full loop back arrangement it becomes possible at the central station to conduct the necessary line tests. If, for example, a test tone is applied at the central station to loop $LA_1$, $LA_2$ at a given amplitude, this tone should be received back through loop $L_1$,$L_2$ with the same amplitude at terminals 1 and 2 if the loops are in proper working order. It will be seen that during the reply period the lines are disconnected from the terminal equipment, for the connections normally made through the A contacts of switches $SW_1$ and $SW_2$ are broken during the reply period.

Bridging Circuit

Figure 3:
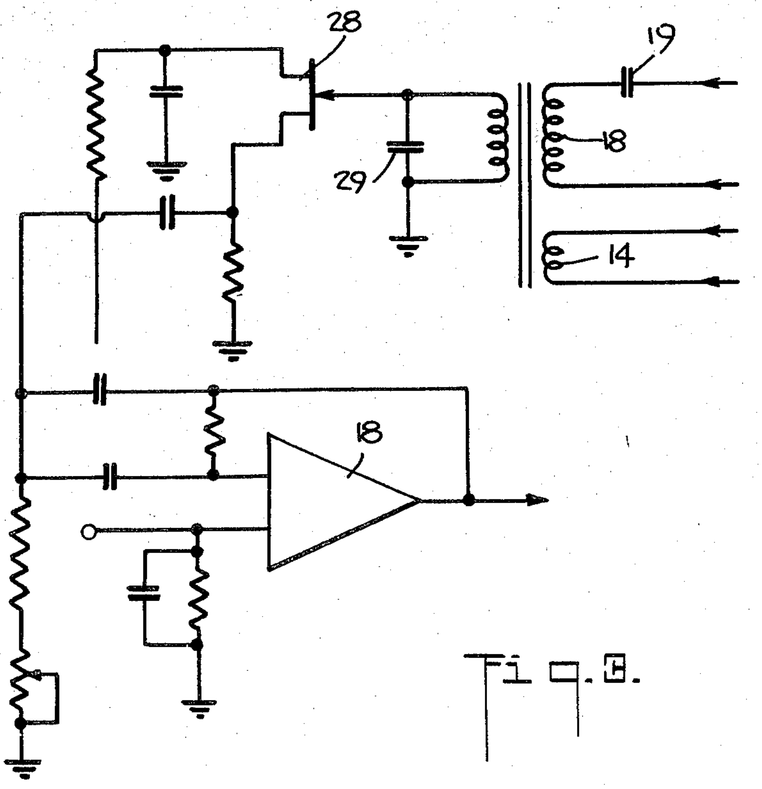
FIG. 3 is a schematic diagram of the input circuit of the unit.

Referring now to FIG. 3, there is shown the bridging circuit of the detection system for intercepting the check tone. This circuit includes transformer 17 having high-impedance primary 18 and low-impedance primary 14 to derive an input from the loop regardless of the condition of the associated terminal equipment.

The secondary 27 of transformer 17 is connected to bridging amplifier 18 through a field-effect transistor 28, the secondary being shunted by a capacitor 29. The parameters of this arrangement are such that the input transformer 17 is tuned to the frequency of the check tone and therefor attenuates all other frequencies.

While there has been shown preferred embodiments of the invention it will be appreciated that many changes and modifications may be made without, however, departing from the essential spirit of the invention.

I claim:

1. A remote loop-back terminating unit for testing the condition of a telephone loop extending between a central station and terminal equipment at a remote point, the unit being interposed between the remote end of the loop and the terminal equipment and comprising:

A. a switching network having a normal position and a test position, said network in the normal position connecting the remote end of the loop to the terminal equipment to render the unit effectively transparent to intelligence signals from said station conveyed over said loop, said network in the test position disconnecting said remote end of the loop from the terminal equipment whereby the loop is then independent of said equipment and it becomes possible at the central station to test said loop;

B. circuit means coupled to said loop to detect a check tone transmitted over said loop from said station when the switching network is in its normal position and to produce a control signal only when said check tone has a predetermined frequency and has a predetermined duration in excess of one second, said circuit means intercepting said check tone regardless of whether said terminal equipment is short circuited, open-circuited or grounded, said circuit means imposing a path across said loop whose impedance with respect to said intelligence signals and said check tone is relatively high and does not interfere with the transparency of said loop;

C. means responsive to said control signal and operatively coupled to said switching network to effect a transfer thereof from the normal position to the test position for a predetermined test period; and D. means independent of said equipment operable only during said test period to render said loop effective for testing from the central station.

2. A unit as set forth in claim 1, wherein said terminal equipment is constituted by a data processing device and said intelligence signals are in pulsatory form, said loop being a Modem line.

3. A unit as set forth in claim 1, wherein said loop is constituted by a two-wire line.

4. A unit as set forth in claim 1, wherein said loop is constituted by a four-wire line.

5. A unit as set forth in claim 1, wherein said circuit means includes a transformer having a high-impedance primary effectively connected across said line to induce a voltage in the secondary only in the absence of a shorting or grounding of said equipment and a low-impedance primary effectively connected in series with said line to induce a voltage in said secondary when said equipment is shorted or grounded.

6. A unit as set forth in claim 1, wherein said means operable only during said test period includes a test tone generator which applies a test tone to the loop to facilitate testing at the central station.

7. A unit as set forth in claim 1, wherein said means operable only during said test period includes a termination resistor shunted across the remote end of the loop to facilitate testing at the central station.

8. A unit as set forth in claim 1, wherein said loop is constituted by a receive line and a transmit line, and wherein said means operable only during said test period acts to inter-connect the remote end of the receive line to the remote end of the transmit line to facilitate full loop-back testing at the central station.

9. A unit as set forth in claim 8, further including an adjustable-gain amplifier interposed between the remote ends of the two lines.

10. A unit as set forth in claim 1, wherein said means to detect a check tone includes a bridging amplifier coupled to the loop to amplify the check tone, a tone filter coupled to the output of the amplifier to pass the check tone and attenuate frequencies other than the frequency of the check tone, and a decoder coupled to the filter to convert the check tone into an analog voltage whose amplitude is a function of the duration of the tone and to integrate the voltage to produce a control signal when the amplitude attains a predetermined level.

* * * * *

UNITED STATES PATENT OFFICE
CERTIFICATE OF CORRECTION

PATENT NO. : 3,912,882
DATED : October 14, 1975
INVENTOR(S) : Ronald Helmut Beerbaum It is certified that error appears in the above-identified patent and that said Letters Patent are hereby corrected as shown below:

IN THE TITLE after "TELEPHONE" -- LINES -- should have been inserted

Column 1, line 3 after "TELEPHONE" -- LINES -- should have been inserted

Column 1, line 58 "hass" should have read -- has --

Column 2, line 20 "zone" should have read -- tone --

Column 5, line 14 before "mark" -- which -- should have been inserted

Column 5, line 55 "is"should be deleted

Column 5, line 59 "termial" should have read -- terminal --

Column 5, line 61 "to" first instance should be deleted

Signed and Sealed this

*thirtieth* Day of *December 1975*

[SEAL]

*Attest:*

RUTH C. MASON
*Attesting Officer*

C. MARSHALL DANN
*Commissioner of Patents and Trademarks*